United States Patent
Li et al.

(10) Patent No.: US 12,541,222 B2
(45) Date of Patent: Feb. 3, 2026

(54) CLOCK CALIBRATION METHOD AND APPARATUS

(71) Applicant: SHENZHEN YINWANG INTELLIGENT TECHNOLOGIES CO., LTD., Shenzhen (CN)

(72) Inventors: Chao Li, Chengdu (CN); Xingxin Zhang, Chengdu (CN); Pengxin Bao, Chengdu (CN); Xuehuan Wang, Chengdu (CN)

(73) Assignee: SHENZHEN YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 295 days.

(21) Appl. No.: 17/957,669

(22) Filed: Sep. 30, 2022

(65) Prior Publication Data

US 2023/0026317 A1    Jan. 26, 2023

Related U.S. Application Data

(63) Continuation of application No. PCT/CN2020/082414, filed on Mar. 31, 2020.

(51) Int. Cl.
*G06F 1/12* (2006.01)
*G06F 1/08* (2006.01)
(Continued)

(52) U.S. Cl.
CPC . *G06F 1/12* (2013.01); *G06F 1/08* (2013.01)

(58) Field of Classification Search
CPC ............. G06F 1/12; G06F 1/08; H04W 56/00
See application file for complete search history.

(56) References Cited

U.S. PATENT DOCUMENTS 6,078,595 A * 6/2000 Jones ............... H04J 3/0688
370/219
10,608,599 B2   3/2020 Sugimoto et al.
(Continued)

FOREIGN PATENT DOCUMENTS

CN   1155359 A    7/1997
CN   102316574 A  1/2012
(Continued)

OTHER PUBLICATIONS

Samsung, "Burst Arrival Time Clock Reference Adjustment Procedure", 3GPP TSG-SA WG2 Meeting #134 S2-1907690, Sapporo, Japan, Jun. 24-28, 2019, Total 7 Pages.
(Continued)

*Primary Examiner* — Jaweed A Abbaszadeh
*Assistant Examiner* — Gayathri Sampath
(74) *Attorney, Agent, or Firm* — Conley Rose, P.C.

(57) ABSTRACT

A clock calibration method and apparatus is provided, where the method includes a terminal device uses first timing information, adjusts second timing information of the terminal device based on reference timing information, and when determining that a first condition is met, switches from using the first timing information to using the second timing information. The first timing information is primary timing information, the second timing information is standby timing information, and the first condition includes that: the first timing information is different from the reference timing information, and the second timing information is the same as the reference timing information; or the first timing information is different from the second timing information; or the first timing information is different from the reference timing information.

20 Claims, 6 Drawing Sheets

(51) Int. Cl.
*H04J 3/06* (2006.01)
*H04W 56/00* (2009.01)

(56) References Cited

U.S. PATENT DOCUMENTS

| | | | |
|---|---|---|---|
| 2002/0136172 A1* | 9/2002 | Chun | H04J 3/0688 370/328 |
| 2004/0048595 A1 | 3/2004 | Miller et al. | |
| 2010/0001770 A1 | 1/2010 | Bogenberger et al. | |
| 2010/0067507 A1 | 3/2010 | Park | |
| 2013/0272362 A1* | 10/2013 | Mirek | H04J 3/0676 375/362 |
| 2017/0269631 A1 | 9/2017 | Bauknecht et al. | |
| 2018/0062780 A1* | 3/2018 | Shimizu | H04N 21/242 |
| 2021/0006344 A1* | 1/2021 | Chen | G01S 19/14 |
| 2022/0045777 A1* | 2/2022 | Amicangioli | H04J 3/0667 |

FOREIGN PATENT DOCUMENTS

| | | |
|---|---|---|
| CN | 106549655 A | 3/2017 |
| CN | 106658626 A | 5/2017 |
| CN | 107395307 A | 11/2017 |
| CN | 108811075 A | 11/2018 |
| CN | 110662284 A | 1/2020 |
| EP | 3141978 A1 | 3/2017 |
| WO | 2009138876 A2 | 11/2009 |

OTHER PUBLICATIONS

IEEE 1588 V2, IEEE Std 15887""—2008 (Revision of IEEE Std 1588-2002), IEEE Standard for a Precision Clock Synchronization Protocol for Networked Measurement and Control Systems, IEEE Instrumentation and Measurement Society, Technical Committee on Sensor Technology (TC-9), dated Jul. 24, 2008, total 289 pages.

IEEE Std 802.1AS—2011, IEEE Standard for Local and metropolitan area networks Timing and Synchronization for Time-Sensitive Applications in Bridged Local Area Networks; Mar. 30, 2011, Total 292 Pages.

P802.1AS-Rev Timing and Synchronization for Time-Sensitive Applications, D8.3 (Oct. 8, 2019), https://1.ieee802.org/tsn/802-1as-rev/, Total 12 Pages.

* cited by examiner

CLOCK CALIBRATION METHOD AND APPARATUS

CROSS-REFERENCE TO RELATED APPLICATIONS

This is a continuation of International Patent Application No. PCT/CN2020/082414 filed on Mar. 31, 2020, the disclosure of which is hereby incorporated by reference in its entirety.

TECHNICAL FIELD

This disclosure relates to the communications field, and in particular, to a clock calibration method and apparatus.

BACKGROUND

Within coverage of an external reference timing signal, for example, a clock signal of a Global Positioning System (GPS), a terminal device adjusts a time and a clock frequency of the terminal device, to keep a same time and a same clock frequency as the external reference timing signal. The terminal device may include a plurality of levels of branch clock nodes. When the terminal device falls beyond the coverage of the external reference timing signal, the terminal device may enter an autonomous state. In other words, times and clock frequencies of all the branch clock nodes in the terminal device are synchronized with a time and a clock frequency of a master clock node.

When the terminal device receives the external reference timing signal again, the terminal device first adjusts the time and the clock frequency of the master clock node to keep synchronous with the external reference timing signal. Then, a clock node at each level of the terminal device performs level-by-level adjustment based on an upper-level clock node. For example, a lower-level clock node of the master clock node adjusts a time and a clock frequency of the lower-level clock node based on the master clock node. The clock node at each level takes some time to complete clock adjustment. Consequently, a relatively large frequency deviation exists between the clock nodes, and the terminal device may run unstably or even crash.

SUMMARY

Embodiments of this disclosure provide a clock calibration method and apparatus, to resolve a problem that in a clock calibration process, a terminal device runs unstably or even crashes because a frequency deviation between clock nodes of the terminal device is excessively large.

To achieve the foregoing objective, the following technical solutions are used in this disclosure.

According to a first aspect, a clock calibration method is provided. The clock calibration method includes a terminal device uses first timing information, adjusts second timing information of the terminal device based on reference timing information, and when determining that a first condition is met, switches from using the first timing information to using the second timing information. The first timing information is primary timing information, the second timing information is standby timing information, and the first condition includes that the first timing information is different from the reference timing information, and the second timing information is the same as the reference timing information; or the first timing information is different from the second timing information; or the first timing information is different from the reference timing information.

Based on the clock calibration method according to the first aspect, when obtaining the reference timing information again, the terminal device first continues to run by using the currently used first timing information, adjusts the second timing information based on the reference timing information, and when a first condition is met, switches from using the first timing information to using the second timing information that is the same as the reference timing information, to resolve a problem that in a clock calibration process, the terminal device runs unstably or even crashes because a clock frequency deviation between clock nodes of the terminal device is excessively large, and therefore, to improve system stability of the terminal device.

In a possible design solution, the reference timing information may be timing information of a global positioning system GPS, a BeiDou satellite navigation system, a Galileo satellite navigation system, or a GLONASS satellite navigation system.

In a possible design solution, the reference timing information includes a reference clock frequency and/or a reference time.

In a possible design solution, that the first timing information is different from the reference timing information may include a clock frequency of the first timing information is different from the reference clock frequency, and/or a time of the first timing information is different from the reference time Similarly, that the second timing information is different from the reference timing information may include a clock frequency of the second timing information is different from the reference clock frequency, and/or a time of the second timing information is different from the reference time.

In a possible design solution, the clock calibration method according to the first aspect may further include the terminal device adjusts the first timing information, so that the first timing information is the same as the reference timing information, and then determines the first timing information as the standby timing information, and/or determines the second timing information as the primary timing information. In other words, after adjusting the first timing information, to make the first timing information the same as the reference timing information, the terminal device may continue to use the second timing information, and use the first timing information as the standby timing information.

In another possible design solution, the clock calibration method according to the first aspect may further include the terminal device adjusts the first timing information, so that the first timing information is the same as the reference timing information, and then determines the first timing information as the primary timing information, and/or determines the second timing information as the standby timing information. In other words, after adjusting the first timing information, to make the first timing information the same as the reference timing information, the terminal device may switch back a working clock of the terminal device from the second timing information to the first timing information, and continue to use the first timing information as the primary timing information.

In a possible design solution, the clock calibration method according to the first aspect may further include when the terminal device determines that a second condition is met, the terminal device adjusts the second timing information. The second condition includes the second timing information is different from the reference timing information. In this way, after obtaining the reference timing information, the terminal device adjusts the second timing information, so that the second timing information is the same as the reference timing information.

According to a second aspect, a clock calibration method is provided. The clock calibration method includes a terminal device obtains reference timing information, and determines a clock frequency deviation M between the terminal device and a first system based on the reference timing information; determines a quantity K of frequency adjustment times based on the clock frequency deviation M and a frequency adjustment step S; adjusts timing information of the terminal device based on the frequency adjustment step S and the quantity K of frequency adjustment times. The frequency adjustment step S is preset or is determined based on a time synchronization error. The first system may be a positioning system having a time serving function, or may be an access network device having a time serving function.

Based on the clock calibration method according to the second aspect, after obtaining the reference timing information, the terminal device determines the clock frequency deviation between the terminal device and the first system, determines the frequency adjustment quantity based on the clock frequency deviation and the frequency adjustment step, and then gradually adjusts the timing information of the terminal device based on the frequency adjustment step and the frequency adjustment quantity, to resolve a problem that in a clock calibration process, the terminal device runs unstably or even crashes because a clock frequency deviation between clock nodes of the terminal device is excessively large, and therefore, to improves system stability of the terminal device.

In a possible design solution, the quantity K of frequency adjustment times meets the following formula: K=ceil(M/S), where ceil is round-up. In this way, the terminal device gradually adjusts a clock frequency of the terminal device for a plurality of times. In an adjustment process, the clock frequency deviation between the clock nodes is within an acceptable range of the terminal device. This ensures stable running of the terminal device.

It should be noted that, when the clock frequency deviation M cannot be exactly divided by the frequency adjustment step S, in a process of K times of frequency adjustment, a frequency adjustment amount of one time of frequency adjustment is less than the frequency adjustment step S, so that adjusted timing information of the terminal device is the same as the reference timing information.

In a possible design solution, that the frequency adjustment step S is determined based on the time synchronization error includes the frequency adjustment step S is determined based on a first adjustment time and the time synchronization error. The first adjustment time is a time required by the terminal device to adjust timing information of the terminal device once, and the time synchronization error is a maximum time error that the terminal device can bear. In other words, a maximum frequency adjustment amount of the terminal device may be determined based on the first adjustment time and the time synchronization error, and the frequency adjustment step is determined based on the maximum frequency adjustment amount. The frequency adjustment step is less than or equal to the maximum frequency adjustment amount, so that the following problem can be resolved in a clock calibration process. The terminal device runs unstably or even crashes because the clock frequency deviation between clock nodes of the terminal device is excessively large, and system stability of the terminal device is improved.

In a possible design solution, the clock calibration method according to the second aspect may further include a first apparatus of the terminal device sends an adjustment message to a second apparatus of the terminal device. The adjustment message may include a frequency adjustment amount, where the frequency adjustment amount is less than or equal to the frequency adjustment step S. In other words, each time the first apparatus of the terminal device sends an adjustment message to the second apparatus, the second apparatus adjusts the timing information once until the timing information is adjusted for K times, so that the timing information of the second apparatus is finally the same as the reference timing information.

Alternatively, the adjustment message may include a frequency adjustment amount and the quantity K of frequency adjustment times, where the frequency adjustment amount is less than or equal to the frequency adjustment step S. In other words, the first apparatus of the terminal device may send the adjustment message to the second apparatus only once, and the second apparatus may adjust the timing information for a plurality of times based on the adjustment message, so that clock calibration efficiency of the terminal device can be improved.

According to a third aspect, a clock calibration apparatus is provided. The clock calibration apparatus includes a processing module. The processing module is configured to use first timing information and adjust second timing information of the clock calibration apparatus based on reference timing information. The first timing information is primary timing information, and the second timing information is standby timing information. The processing module is further configured to, when determining that a first condition is met, switch from using the first timing information to using the second timing information. The first condition includes the first timing information is different from the reference timing information, and the second timing information is the same as the reference timing information; or the first timing information is different from the second timing information; or the first timing information is different from the reference timing information.

In a possible design solution, the reference timing information is timing information of a GPS, a BeiDou satellite navigation system, a Galileo satellite navigation system, or a GLONASS satellite navigation system.

In a possible design solution, the reference timing information includes a reference clock frequency and/or a reference time.

In a possible design solution, that the first timing information is different from the reference timing information includes a clock frequency of the first timing information is different from the reference clock frequency, and/or a time of the first timing information is different from the reference time.

In a possible design solution, the processing module is further configured to adjust the first timing information, so that the first timing information is the same as the reference timing information. The processing module is further configured to determine the first timing information as the standby timing information, and/or the processing module is further configured to determine the second timing information as the primary timing information.

In another possible design solution, the processing module is further configured to adjust the first timing information, so that the first timing information is the same as the reference timing information. The processing module is further configured to determine the first timing information as the primary timing information, and/or the processing module is further configured to determine the second timing information as the standby timing information.

In a possible design solution, the processing module is further configured to adjust the second timing information of the clock calibration apparatus when determining that a second condition is met. The second condition includes the second timing information is different from the reference timing information.

In a possible design solution, the clock calibration apparatus according to the third aspect may further include a transceiver module. The transceiver module is configured to receive data sent by a first system, for example, the reference timing information. Optionally, the transceiver module may be further configured to send data to another device. Further, the transceiver module may include a receiving module and a sending module. The receiving module is configured to receive data sent by the first system, and the sending module is configured to send data to the another device. An implementation of the transceiver module is not limited in this disclosure.

In a possible design solution, the clock calibration apparatus according to the third aspect may further include a storage module, and the storage module stores a program or instructions. When the processing module executes the program or the instructions, the clock calibration apparatus according to the third aspect may perform the clock calibration method according to any possible implementation of the first aspect.

It should be noted that the clock calibration apparatus according to the third aspect may be a terminal device, or may be a component or a combined component in the terminal device, or may be a chip or a chip system disposed in the terminal device. This is not limited in this disclosure.

In addition, for a technical effect of the clock calibration apparatus in the third aspect, refer to a technical effect of the clock calibration method in any possible implementation of the first aspect. Details are not described herein again.

According to a fourth aspect, a clock calibration apparatus is provided. The clock calibration apparatus includes a processing module. The processing module is configured to obtain reference timing information. The processing module is further configured to determine a clock frequency deviation M between the clock calibration apparatus and a first system based on the reference timing information. The processing module is further configured to determine a quantity K of frequency adjustment times based on the clock frequency deviation M and a frequency adjustment step S. The frequency adjustment step S is preset or determined based on a time synchronization error. The processing module is further configured to adjust timing information of the clock calibration apparatus based on the frequency adjustment step S and the quantity K of frequency adjustment times.

In a possible design solution, the quantity K of frequency adjustment times meets the following formula: K=ceil(M/S), where ceil is round-up. In a possible design solution, that the frequency adjustment step S is determined based on the time synchronization error may include the frequency adjustment step S is determined based on a first adjustment time and the time synchronization error, the first adjustment time is a time required by the clock calibration apparatus to adjust timing information once, and the time synchronization error is a maximum time error that the clock calibration apparatus can bear.

In a possible design solution, the processing module is further configured to control a first apparatus of the clock calibration apparatus to send an adjustment message to a second apparatus of the clock calibration apparatus. The adjustment message includes a frequency adjustment amount, or a frequency adjustment amount and the quantity K of frequency adjustment times, and the frequency adjustment amount is less than or equal to the frequency adjustment step S.

In a possible design solution, the clock calibration apparatus according to the fourth aspect may further include a transceiver module. The transceiver module is configured to receive data sent by the first system, and may be further configured to send data to another device. Further, the transceiver module may include a receiving module and a sending module. The receiving module is configured to receive data sent by the first system, and the sending module is configured to send data to the another device. An implementation of the transceiver module is not limited in this disclosure.

In a possible design solution, the clock calibration apparatus according to the fourth aspect may further include a storage module, and the storage module stores a program or instructions. When the processing module executes the program or the instructions, the clock calibration apparatus according to the fourth aspect may perform the clock calibration method according to any possible implementation of the second aspect.

It should be noted that the clock calibration apparatus according to the fourth aspect may be a terminal device, or may be a component or a combined component in the terminal device, or may be a chip or a chip system disposed in the terminal device. This is not limited in this disclosure.

In addition, for a technical effect of the clock calibration apparatus in the fourth aspect, refer to a technical effect of the clock calibration method in any possible implementation of the second aspect. Details are not described herein again.

According to a fifth aspect, a clock calibration apparatus is provided. The clock calibration apparatus includes a processor, where the processor is coupled to a memory. The memory is configured to store a computer program. The processor is configured to execute the computer program stored in the memory, so that the clock calibration apparatus performs the clock calibration method according to any one of the possible implementations of the first aspect to the second aspect.

In a possible design, the clock calibration apparatus according to the fifth aspect may further include a transceiver. The transceiver may be a transceiver circuit or an input/output port. The transceiver may be configured for the clock calibration apparatus to communicate with a first system.

In this disclosure, the clock calibration apparatus according to the fifth aspect may be a terminal device, or a chip or a chip system disposed inside a terminal device.

In addition, for a technical effect of the clock calibration apparatus in the fifth aspect, refer to a technical effect of the clock calibration method in any implementation of the first aspect. Details are not described herein again.

According to a sixth aspect, a communications system is provided. The system includes a terminal device and a first system, such as a GPS, a BeiDou satellite navigation system, a Galileo satellite navigation system, a GLONASS satellite navigation system, and an access network device having a time serving function.

According to a seventh aspect, a computer-readable storage medium is provided, and the computer-readable storage medium stores computer instructions. When the computer instructions run on a computer, the computer is enabled to perform the clock calibration method according to any one of the possible implementations of the first aspect to the second aspect.

According to an eighth aspect, a computer program product including instructions is provided, including a computer program or instructions. When the computer program or the instructions is/are run on a computer, the computer is enabled to perform the clock calibration method according to any one of the first aspect or the possible implementations of the second aspect.

DESCRIPTION OF EMBODIMENTS

The following describes technical solutions of this disclosure with reference to accompanying drawings.

The technical solutions in embodiments of this disclosure may be applied to various communications systems, such as a Wi-Fi system, a vehicle-to-everything (V2X) system, a device-to-device (D2D) communications system, an internet of vehicles communications system, a 4th generation (4G) mobile communications system, for example, a Long-Term Evolution (LTE) system, a Worldwide Interoperability for Microwave Access (WiMAX) communications system, and a 5th generation (5G) mobile communications system, for example, a new radio (NR) system, and a future communications system, for example, a 6th generation (6G) mobile communications system.

All aspects, embodiments, or features are presented in this disclosure by describing a system that may include a plurality of devices, components, modules, and the like. It should be appreciated and understood that, each system may include another device, component, module, and the like, and/or may not include all devices, components, modules, and the like discussed with reference to the accompany drawings. In addition, a combination of these solutions may be used.

In addition, in the embodiments of this disclosure, the terms such as "for example" and "such as" are used to represent giving an example, an illustration, or a description. Any embodiment or design scheme described as an "example" in this disclosure should not be explained as being more preferred or having more advantages than another embodiment or design scheme. Exactly, "for example" is used to present a concept in a specific manner.

In the embodiments of this disclosure, information (information), signal (signal), message (message), channel (channel), and signaling (signaling) may sometimes be used together. It should be noted that expressed meanings are consistent when differences are not emphasized. "Of (of)", "corresponding (corresponding, relevant)", and "corresponding (corresponding)" may be interchangeably used sometimes. It should be noted that meanings expressed by the terms are consistent when differences are not emphasized.

In the embodiments of this disclosure, sometimes a subscript such as $W_1$ may be written in an incorrect form such as W1. Expressed meanings are consistent when differences between them are not emphasized.

The network architecture and the service scenario described in the embodiments of this disclosure are intended to describe the technical solutions in the embodiments of this disclosure more clearly, and do not constitute a limitation on the technical solutions provided in the embodiments of this disclosure. A person of ordinary skill in the art may know that with the evolution of the network architecture and the emergence of new service scenarios, the technical solutions provided in the embodiments of this disclosure are also applicable to similar technical problems.

Figure 1:
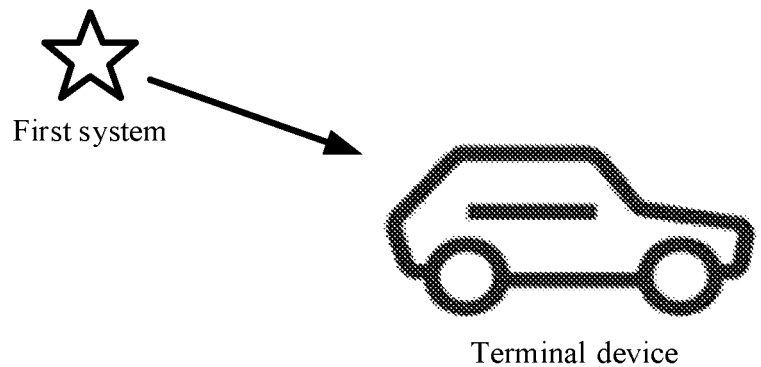
FIG. 1 is a schematic architectural diagram of a communications system according to an embodiment of this disclosure.

FIG. 1 is a schematic architectural diagram of a communications system applicable to a clock calibration method according to an embodiment of this disclosure. For ease of understanding the embodiments of this disclosure, a communications system shown in FIG. 1 is first used as an example to describe in detail a communications system applicable to the embodiments of this disclosure. It should be noted that the solutions in the embodiments of this disclosure may also be applied to another mobile communications system, and a corresponding name may also be replaced with a name of a corresponding function in the another mobile communications system.

As shown in FIG. 1, the communications system includes a terminal device and a first system.

The first system is a system that can provide reference timing information, and may be a positioning system with a time serving function, or may be an access network device with a time serving function. The first system includes but is not limited to a GPS, a BeiDou navigation satellite system (BDS), a GLONASS navigation satellite system (global navigation satellite system, GLONASS), and a Galileo navigation satellite system, or may be a 5G system, for example, a gNodeB (gNB) or a transmission point (TRP or TP) having a time serving function in a NR system, or one or a group of antenna panels (including a plurality of antenna panels) of a base station in a 5G system, or may be a network node that has a time serving function and that constitutes a gNB or a transmission point, for example, a baseband unit (BBU), a distributed unit (DU), or a roadside unit (RSU).

The terminal device is a terminal that accesses the communications system and that has a wireless transceiver function, or a chip or a chip system that can be disposed on the terminal. The terminal device may be referred to as a user apparatus, an access terminal, a subscriber unit, a subscriber station, a mobile station, a mobile console, a remote station, a remote terminal, a mobile device, a user terminal, a terminal, a wireless communications device, a user agent or a user apparatus. The terminal device in the embodiments of this disclosure may be a mobile phone, a tablet computer (Pad), a computer having a wireless transceiver function, a virtual reality (VR) terminal device, an augmented reality (AR) terminal device, a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home, a vehicle-mounted terminal, and an RSU with a terminal function, or the like. The terminal device in this disclosure may alternatively be an in-vehicle module, an in-vehicle module, an in-vehicle component, an in-vehicle chip, or an in-vehicle unit that is built in a vehicle as one or more components or units, for example, a sensor, such as a millimeter-wave radar, a laser radar, an ultrasonic radar, a camera, a positioning system, an inertial measurement unit (IMU), a speed sensor, an acceleration sensor, a humidity sensor, a light intensity sensor, or the like that is used in a vehicle, and a telematics box; for another example, a switch or a router configured to converge and transfer various data services; and for still another example, a controller, such as a vehicle-mounted computing platform, a vehicle-mounted computer, a domain controller, a multi-domain controller, a self-driving controller, an information entertainment controller, a black box in a vehicle, or an event data recorder. The vehicle may implement, by using the in-vehicle module, in-vehicle module, in-vehicle component, in-vehicle chip, or in-vehicle unit that is built in the vehicle, the clock calibration method provided in this disclosure.

It should be understood that FIG. 1 is merely a simplified schematic diagram of an example for ease of understanding. The communications system may further include another network device and/or another terminal device that are/is not shown in FIG. 1.

Figure 2:
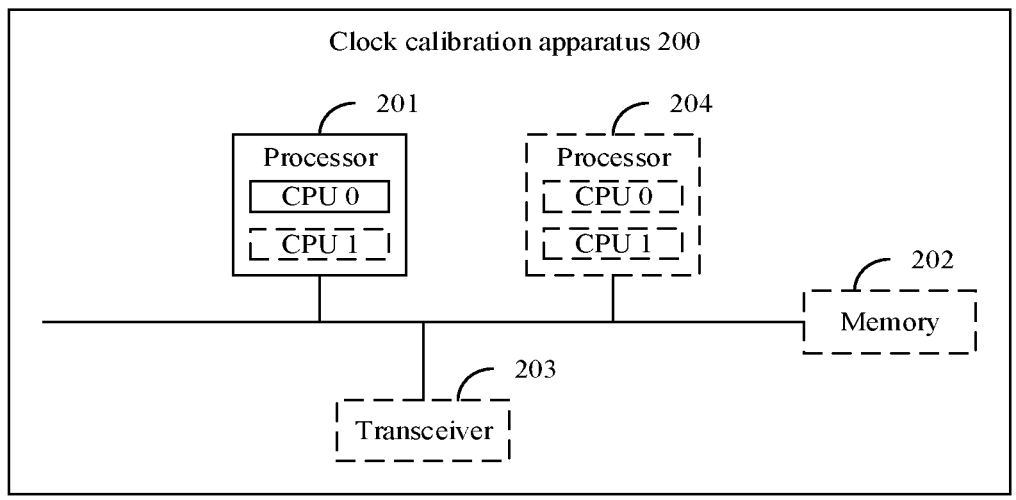
FIG. 2 is a schematic structural diagram of a clock calibration apparatus according to an embodiment of this disclosure.

FIG. 2 is a schematic structural diagram of a clock calibration apparatus 200 that can be configured to perform a clock calibration method according to an embodiment of this disclosure. The clock calibration apparatus 200 may be a terminal device, or may be a chip applicable to a terminal device, or another component having a terminal function. As shown in FIG. 2, the clock calibration apparatus 200 includes a processor 201. Optionally, the clock calibration apparatus 200 may further include a memory 202 and/or a transceiver 203. The processor 201 is coupled to the memory 202 and the transceiver 203, for example, may be connected by using a communications bus.

Components of the clock calibration apparatus 200 are described in detail below with reference to FIG. 2.

The processor 201 is a control center of the clock calibration apparatus 200, and may be one processor or may be a collective term of a plurality of processing elements. For example, the processor 201 may be one or more central processing units (CPU), or an application-specific integrated circuit (ASIC), or may be configured as one or more integrated circuits implementing this embodiment of this disclosure, for example, one or more microprocessors such as a digital signal processor (DSP) or one or more field-programmable gate arrays (FPGAs).

The processor 201 may execute various functions of the clock calibration apparatus 200 by running or executing a software program stored in the memory 202 and invoking data stored in the memory 202.

During implementation, in an embodiment, the processor 201 may include one or more CPUs, for example, a CPU 0 and a CPU 1 shown in FIG. 2.

In an implementation, in an embodiment, the clock calibration apparatus 200 may alternatively include a plurality of processors, for example, the processor 201 and a processor 204 that are shown in FIG. 2. Each of the processors may be a single-core processor (single-CPU) or may be a multi-core processor (multi-CPU). The processor herein may be one or more communications devices, circuits, and/or processing cores configured to process data (for example, computer program instructions).

The memory 202 may be a read-only memory (ROM) or another type of static storage communications device that can store static information and an instruction; or a random-access memory (RAM) or another type of dynamic storage communications device that can store information and an instruction. The memory 202 may alternatively be an electrically erasable programmable read-only memory (EEPROM), a compact disc read-only memory (CD-ROM) or another compact disc storage, optical disc storage (including a compact disc, a laser disc, an optical disc, a digital versatile disc, a Blu-ray disc, or the like), a magnetic disk storage medium or another magnetic storage communications device, or any other medium that can be used to carry or store expected program code in a form of an instruction or a data structure and that is accessible by a computer, but is not limited thereto. The memory 202 may be integrated with the processor 201, or may exist independently, and is coupled to the processor 201 by using an input/output port (not shown in FIG. 2) of the clock calibration apparatus 200. This is not limited in this embodiment of this disclosure.

The memory 202 is configured to store a software program for performing solutions of this disclosure, and the processor 201 controls execution of the software program. For the foregoing implementations, refer to the following method embodiment. Details are not described herein.

The transceiver 203 is configured to communicate with another clock calibration apparatus. For example, the clock calibration apparatus 200 is a terminal device, and the transceiver 203 may be configured to communicate with a first system. In addition, the transceiver 203 may include a receiver and a transmitter (not shown separately in FIG. 2). The receiver is configured to implement a receiving function, and the transmitter is configured to implement a sending function. The transceiver 203 may be integrated with the processor 201, or may exist independently, and is coupled to the processor 201 by using an input/output port (not shown in FIG. 2) of the clock calibration apparatus 200. This is not limited in this embodiment of this disclosure.

It should be noted that a structure of the clock calibration apparatus 200 shown in FIG. 2 does not constitute a limitation on the clock calibration apparatus. An actual clock calibration apparatus may include more or fewer components than those shown in FIG. 2, or combine some components, or have different component arrangements.

The following describes in detail a clock calibration method provided in the embodiments of this disclosure with reference to FIG. 3 to FIG. 8.

Figure 3:
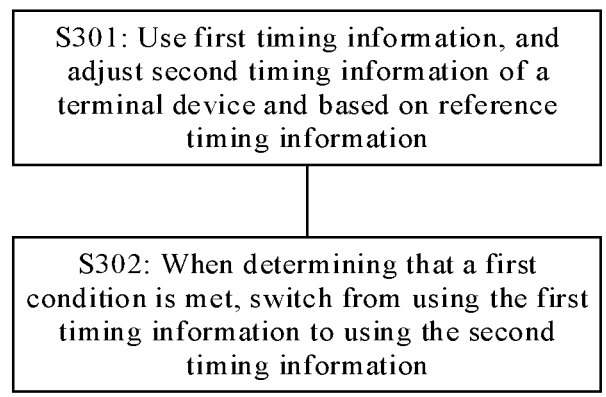
FIG. 3 is a schematic flowchart of a clock calibration method according to an embodiment of this disclosure.

FIG. 3 is a schematic flowchart of a clock calibration method according to an embodiment of this disclosure. The clock calibration method may be applicable to communication between the terminal device and the first system shown in FIG. 1.

As shown in FIG. 3, the clock calibration method includes the following steps.

S301: A terminal device uses first timing information, and adjusts second timing information of the terminal device based on reference timing information.

The first timing information is primary timing information, and the second timing information is standby timing information. In other words, the terminal device has two sets of timing information. The primary timing information is used as primary timing information, and the standby timing information is used as standby timing information. One set of timing information in the first timing information and the second timing information may be set as primary timing information, and the other set of timing information may be set as standby timing information based on an actual requirement of the terminal device.

Figure 4:
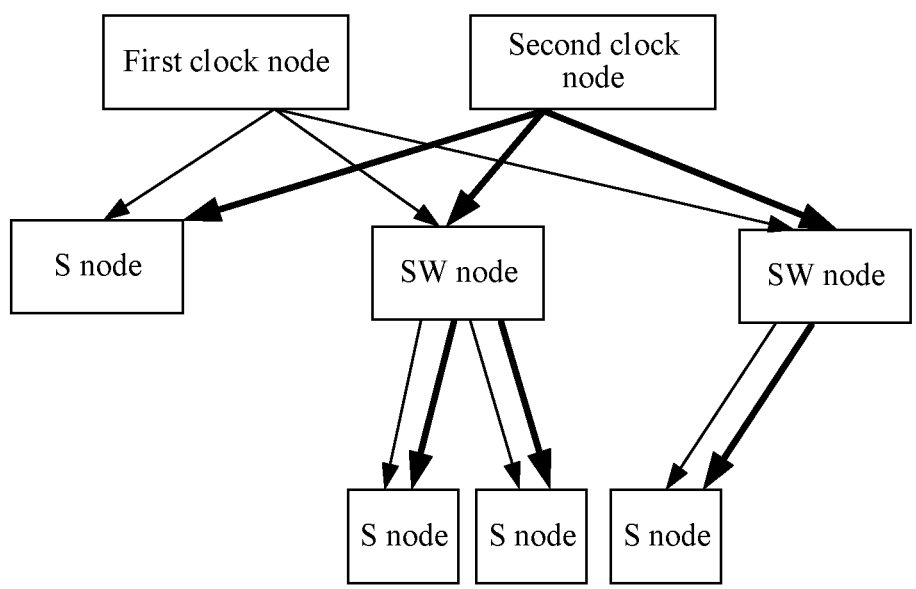
FIG. 4 is a clock synchronization network of a terminal device according to an embodiment of this disclosure.

FIG. 4 is a clock synchronization network of a terminal device according to an embodiment of this disclosure. As shown in FIG. 4, the clock synchronization network of the terminal device may include a first clock node and a second clock node. In addition, a branch clock node such as a switch (SW) node and a sensor (S) node may be further included. The S node may be a lower-level clock node of the SW node, or may be a lower-level clock node of the first clock node or the second clock node. It should be noted that FIG. 4 is merely an example of the clock synchronization network of the terminal device according to this embodiment of this disclosure, and the clock synchronization network of the terminal device is not limited in this disclosure. Timing information of the SW node and the S node includes timing information that is the same as timing information of the first clock node, and timing information that is the same as timing information of the second clock node.

Optionally, the first timing information may include the timing information of the first clock node. The first timing information may further include timing information that is the same as the timing information of the first clock node and that is of the branch clock node, for example, timing information that is the same as the timing information of the first clock node and that is of each SW node, and timing information that is the same as the timing information of the first clock node and that is of each S node.

Optionally, the second timing information may include the timing information of the second clock node. The second timing information may further include timing information that is the same as the timing information of the second clock node and that is of the branch clock node, for example, timing information that is the same as the timing information of the second clock node and that is of each SW node, and timing information that is the same as the timing information of the second clock node and that is of each S node.

With reference to FIG. 4, that the terminal device uses the first timing information may include the terminal device uses the timing information of the first clock node, and uses the timing information that is the same as the timing information of the first clock node and that is of the SW node and the timing information that is the same as the timing information of the first clock node and that is of the S node.

With reference to FIG. 4, that the terminal device uses the first timing information and adjusts the second timing information of the terminal device based on the reference timing information may include the terminal device adjusts the timing information of the second clock node and the timing information of the branch clock node based on the reference timing information while using the first timing information, for example, the timing information that is of the SW node and that is the same as the timing information of the second clock node and the timing information that is of the S node and that is the same as the timing information of the second clock node.

Optionally, the reference timing information may be timing information of a GPS, a BeiDou satellite navigation system, a Galileo satellite navigation system, or a GLONASS satellite navigation system. Alternatively, the reference timing information may be timing information of an access network device having a time serving function.

Optionally, the reference timing information may include a reference clock frequency and/or a reference time. Taking the GPS system as an example, the reference clock frequency may be 1575.42 megahertz (MHz). The reference time may also be referred to as an absolute time or a real time, for example, 07:23:30 on Mar. 18, 2005.

In a possible design solution, when the terminal device determines that a second condition is met, the terminal device adjusts the second timing information.

Optionally, the second condition includes the second timing information is different from the reference timing information.

In other words, after the terminal device obtains the reference timing information again, if the terminal device determines that the second timing information is different from the reference timing information, the terminal device adjusts the second timing information based on the reference timing information, so that the second timing information is the same as the reference timing information.

Optionally, that the second timing information is different from the reference timing information includes a clock frequency of the second timing information is different from the reference clock frequency, and/or a time of the second timing information is different from the reference time.

S302: When determining that a first condition is met, the terminal device switches from using the first timing information to using the second timing information.

The first condition includes the first timing information is different from the reference timing information, and the second timing information is the same as the reference timing information. For example, after obtaining the reference timing information again, the terminal device adjusts the second timing information, so that the second timing information is the same as the reference timing information. However, because the first timing information is not adjusted, the first timing information is different from the reference timing information. In this case, the terminal device switches to use the second timing information.

Alternatively, the first condition includes the first timing information is different from the second timing information. For example, after obtaining the reference timing information again, the terminal device adjusts the second timing information, so that the second timing information is the same as the reference timing information. However, because the first timing information is not adjusted, the first timing information is different from the second timing information. In this case, the terminal device switches to use the second timing information.

Alternatively, the first condition includes the first timing information is different from the reference timing information. For example, after obtaining the reference timing information again, the terminal device adjusts the second timing information, so that the second timing information is the same as the reference timing information. However, because the first timing information is not adjusted, the first timing information is different from the reference timing information. In this case, the terminal device switches to use the second timing information.

Optionally, that the first timing information is different from the reference timing information may include a clock frequency of the first timing information is different from the reference clock frequency, and/or a time of the first timing information is different from the reference time.

Optionally, that the first timing information is different from the second timing information may include a clock frequency of the first timing information is different from a clock frequency of the second timing information, and/or a time of the first timing information is different from a time of the second timing information.

It should be noted that, that the second timing information is the same as the reference timing information may be understood as that a particular error may exist between the second timing information and the reference timing information, provided that the error is within an allowed range. Specifically, it can be ensured that the terminal device can normally communicate with a network.

Figure 5:
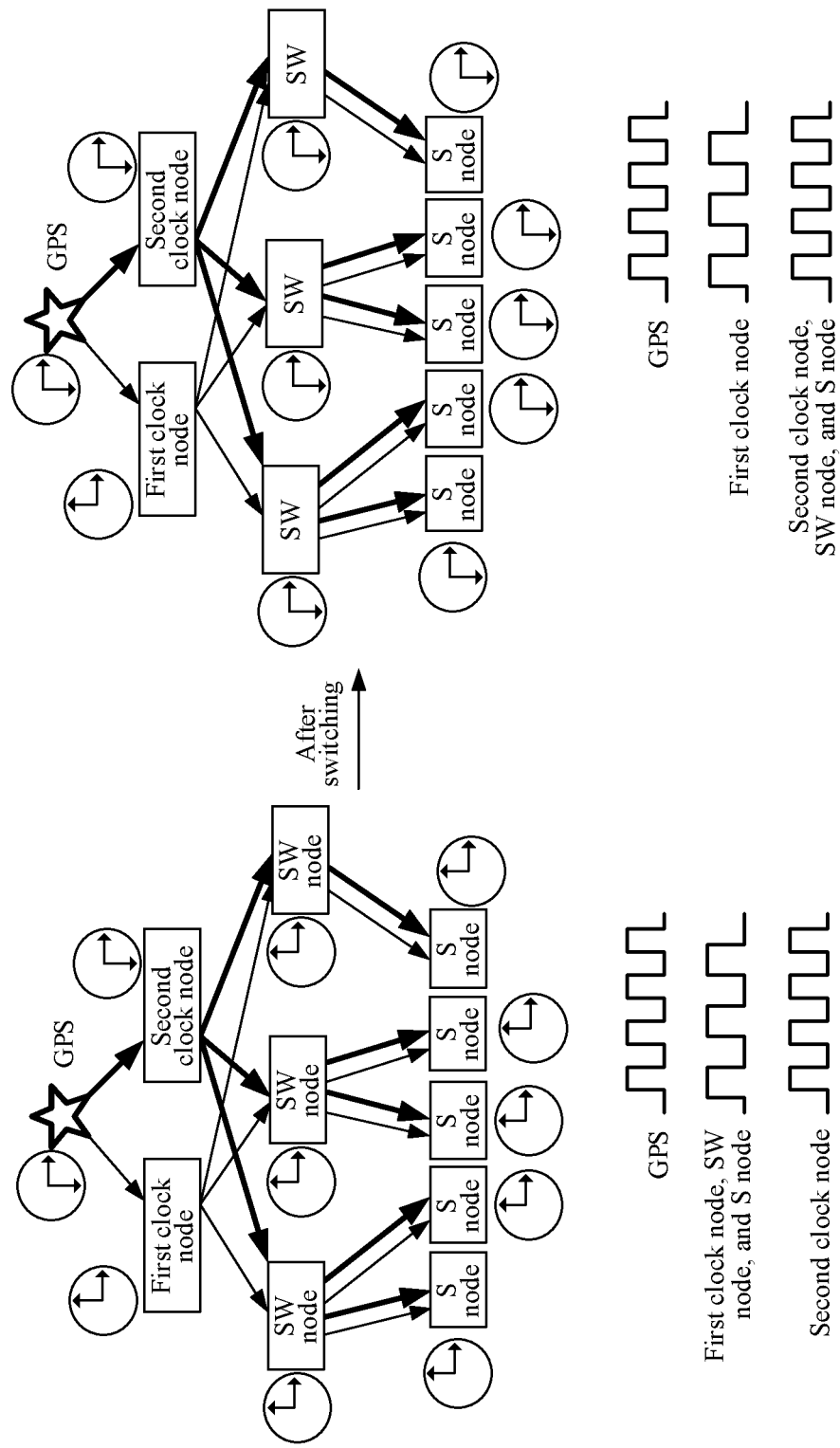
FIG. 5 is another clock synchronization network of a terminal device according to an embodiment of this disclosure.

FIG. 5 shows another clock synchronization network of a terminal device according to an embodiment of this disclosure.

For example, reference timing information is timing information of a GPS. FIG. 5 shows the timing information of the GPS and a current clock frequency and time of an internal node of the terminal device.

With reference to FIG. 5, before the terminal device switches from using first timing information to using second timing information, after the terminal device adjusts second timing information of the terminal device based on the reference timing information (for example, the timing information of the GPS), timing information of a second clock node is the same as the reference timing information, each branch clock node of the terminal device uses timing information of a first clock node.

With reference to FIG. 5, after the terminal device is switched from using the first timing information to using the second timing information, each branch clock node of the terminal device uses the timing information of the second clock node. In other words, current times of an SW node and an S node are the same as a reference time of the reference timing information (for example, the timing information of the GPS). A current clock frequency is the same as a reference clock frequency (such as a clock frequency of the GPS).

In a possible design solution, the terminal device adjusts the first timing information, so that the first timing information is the same as the reference timing information, and determines the first timing information as standby timing information, and/or determines the second timing information as primary timing information.

In other words, after adjusting the first timing information, so that the first timing information is the same as the reference timing information, the terminal device may continue to use the second timing information, and use the first timing information as the standby timing information.

In another possible design solution, the terminal device adjusts the first timing information, so that the first timing information is the same as the reference timing information, and determines the first timing information as primary timing information, and/or determines the second timing information as standby timing information.

In other words, after adjusting the first timing information, to make the first timing information the same as the reference timing information, the terminal device may switch back a working clock of the terminal device from the second timing information to the first timing information, and continue to use the first timing information as the primary timing information.

It should be noted that, when one of the first timing information and the second timing information is determined as the primary timing information, the other timing information may be determined as the standby timing information by default. Similarly, when one of the first timing information and the second timing information is determined as the standby timing information, the other timing information may be determined as the primary timing information by default.

Based on the clock calibration method shown in FIG. 3, when obtaining the reference timing information again, the terminal device first continues to run by using the currently used first timing information, adjusts the second timing information based on the reference timing information, and when a first condition is met, switches from using the first timing information to using the second timing information that is the same as the reference timing information, to resolve a problem that in a clock calibration process, the terminal device runs unstably or even crashes because a clock frequency deviation between clock nodes of the terminal device is excessively large, and therefore, to improve system stability of the terminal device.

Figure 6:
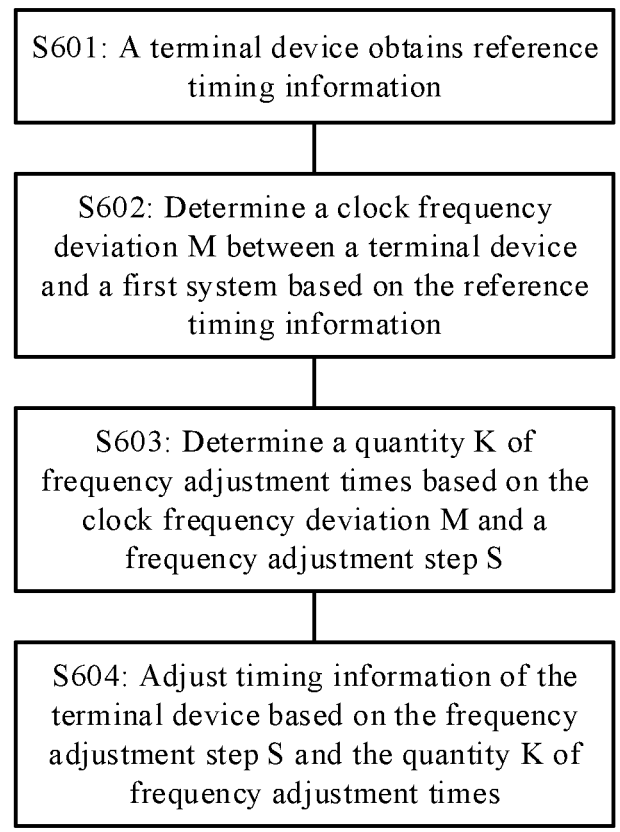
FIG. 6 is another schematic flowchart of a clock calibration method according to an embodiment of this disclosure.

FIG. 6 is another schematic flowchart of a clock calibration method according to an embodiment of this disclosure. The clock calibration method may be applicable to communication between the terminal device and the first system shown in FIG. 1. As shown in FIG. 6, the clock calibration method includes the following steps.

S601: A terminal device obtains reference timing information.

In a possible design solution, a first system may send a time serving message to the terminal device. Correspondingly, the terminal device may receive the time serving message from the first system.

Optionally, the time serving message may carry the reference timing information. For an implementation of the reference timing information, refer to S301. Details are not described herein again.

Figure 7:
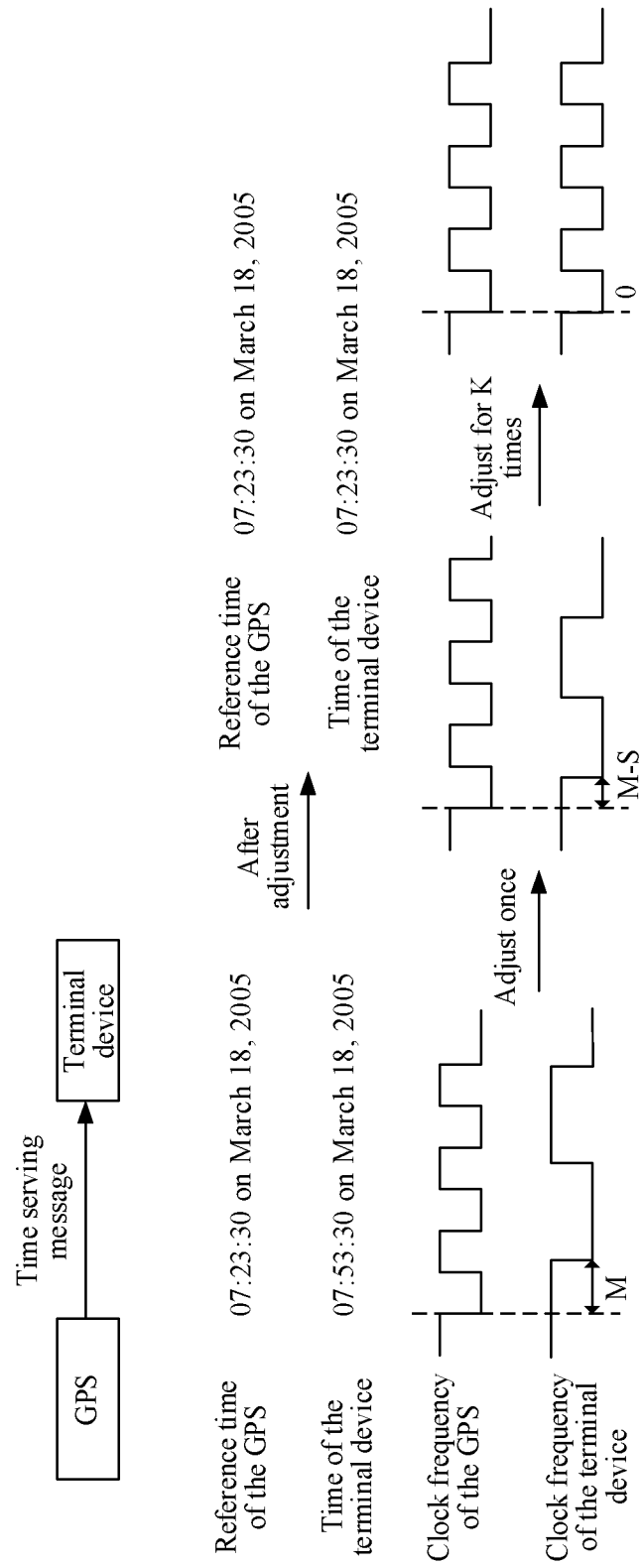
FIG. 7 is another schematic flowchart of a clock calibration method according to an embodiment of this disclosure.

FIG. 7 is another schematic flowchart of a clock calibration method according to an embodiment of this disclosure. For example, a GPS is used as a first system, and the GPS sends a time serving message to a terminal device. Correspondingly, the terminal device receives the time serving message from the GPS. With reference to FIG. 7, the terminal device may obtain a GPS reference time 7:23:30 on Mar. 18, 2005 and a reference clock frequency 1575.42 MHz.

It should be noted that, after obtaining the reference time, if determining that a time of the terminal device is different from the reference time, the terminal device may set the time of the terminal device as the reference time. With reference to FIG. 7, before the adjustment, a time of the terminal device is 7:53:30 on Mar. 18, 2005, and after the adjustment, the time of the terminal device is 7:23:30 on Mar. 18, 2005.

S602: The terminal device determines a clock frequency deviation M between the terminal device and the first system based on the reference timing information.

Optionally, the terminal device may determine the clock frequency deviation between the terminal device and the first system based on timing information of the terminal device and the reference timing information. The timing information of the terminal device may include a clock frequency and/or a time of the terminal device. For an implementation, refer to an existing implementation. Details are not described in this embodiment of this disclosure.

S603: The terminal device determines a quantity K of frequency adjustment times based on the clock frequency deviation M and a frequency adjustment step S.

Optionally, the frequency adjustment step S is preset or determined based on a time synchronization error.

Optionally, the quantity K of frequency adjustment times may meet the following formula:

$$K \geq \mathrm{ceil}(M/S) \tag{1}$$

In the foregoing formula (1), ceil is round-up.

A minimum value of K is ceil(M/S). In this case, when the clock frequency deviation M cannot be exactly divided by the frequency adjustment step S, in a process of K times of frequency adjustment, a frequency adjustment amount of one time of frequency adjustment is less than the frequency adjustment step S.

With reference to FIG. 7, the clock frequency deviation between the terminal device and the GPS is M, and the frequency adjustment step is S. When M can be exactly divided by S, a frequency adjustment amount of the terminal device each time is the frequency adjustment step S. After K times of adjustment, the clock frequency of the terminal device is the same as the clock frequency of the GPS. When M cannot be exactly divided by S, the terminal device adjusts for K−1 times by using the frequency adjustment amount as the frequency adjustment step S, and adjusts once by using the frequency adjustment amount less than the frequency adjustment step S. Finally, the clock frequency of the terminal device is the same as the clock frequency of the GPS.

It may be understood that, when K>ceil(M/S), an adjustment amount of at least two times may be less than the frequency adjustment step S.

In a possible design solution, the terminal device may preset the frequency adjustment step S based on a frequency deviation that the terminal device can bear, and the frequency adjustment step S may be less than or equal to a maximum frequency deviation that the terminal device can bear.

In another possible design solution, that the frequency adjustment step S is determined based on the time synchronization error includes the frequency adjustment step S is determined based on a first adjustment time and the time synchronization error.

Optionally, the first adjustment time is a time required by the terminal device to adjust timing information of the terminal device once, and the time synchronization error is a maximum time error that the terminal device can bear.

Figure 8:
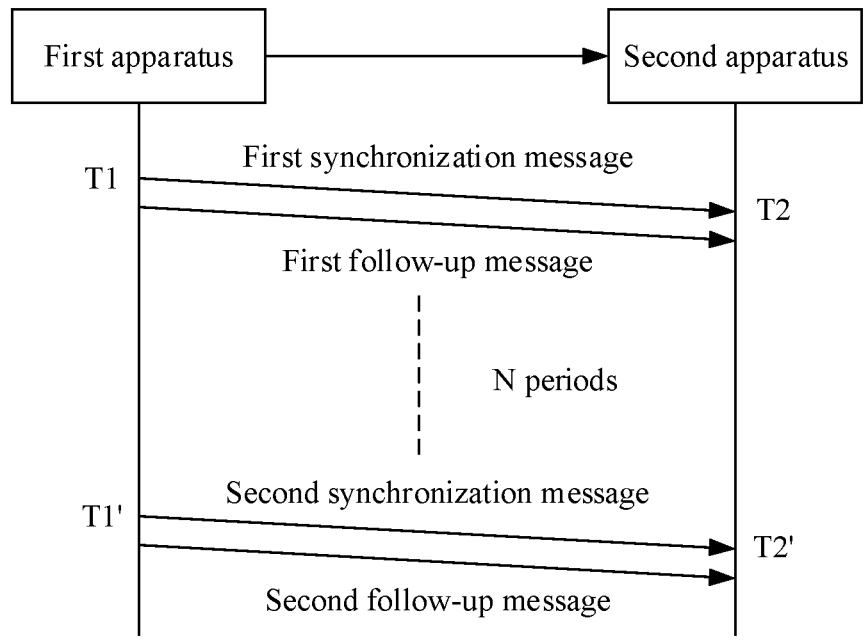
FIG. 8 is another schematic flowchart of a clock calibration method according to an embodiment of this disclosure.

FIG. 8 is a schematic flowchart of another clock calibration method according to an embodiment of this disclosure. With reference to FIG. 8, the following describes a method for determining a frequency adjustment step S based on a time synchronization error.

As shown in FIG. 8, the terminal device may include a first apparatus and a second apparatus. The first apparatus may be an upper-level apparatus of the second apparatus. With reference to FIG. 4, the first apparatus may be a primary clock node or a standby clock node, and the second apparatus may be a switch node and/or a sensor node. For another example, when the first apparatus is a switch, the second apparatus may be the sensor node.

Further, with reference to FIG. 8, a process in which the second apparatus adjusts timing information of the second apparatus, to make the timing information of the second apparatus the same as timing information of the first apparatus is as follows. The first apparatus periodically sends a synchronization (sync) message and a follow-up message to the second apparatus, where the follow-up message includes a sending time of the synchronization message. Correspondingly, the second apparatus may receive the synchronization message and the follow-up message, record a time at which the synchronization message is received, and then adjust, based on two pairs of synchronization messages and follow-up messages, the timing information of the second apparatus, so that the timing information of the second apparatus is the same as the timing information of the first apparatus.

As shown in FIG. 8, the first apparatus sends a first synchronization message and a first following message to the second apparatus. Correspondingly, the second apparatus receives the first synchronization message and the first following message from the first apparatus. A sending time of the first synchronization message is T1, the first following message includes T1, and a time at which the second apparatus receives the first synchronization message is T2.

After N periods, N is an integer greater than or equal to 1, and the first apparatus sends a second synchronization message and a second following message to the second apparatus. Correspondingly, the second apparatus receives the second synchronization message and the second following message from the first apparatus. A sending time of the second synchronization message is T1', the second following message includes T1', and a time at which the second apparatus receives the second synchronization message is T2'. In this case, a time required for sending the two pairs of synchronization messages and following messages by the first apparatus is T1'-T1.

In other words, the second apparatus of the terminal device needs to adjust timing information based on the time of T1'-T1. In other words, the first adjustment time may be T1'-T1.

For example, the method of determining a frequency adjustment step S based on the time synchronization error may be implemented as the following steps.

First, a maximum frequency adjustment ratio is calculated.

If the first adjustment time T1'-T1 is 200 milliseconds (ms) and the time synchronization error is 250 microseconds (μs), the maximum frequency adjustment ratio is 250/200000=1250 parts per million (ppm).

Then, a maximum frequency adjustment amount is calculated.

If a clock frequency of the terminal device is 1560 MHz, the maximum frequency adjustment amount is 1250 ppm× 1560 MHz=1.95 MHz.

Finally, the frequency adjustment step S is determined based on the maximum frequency adjustment amount.

The frequency adjustment step S is less than or equal to the maximum frequency adjustment amount, that is, as long as the frequency adjustment step S is less than or equal to 1.95 MHz. For example, the frequency adjustment step S may be set to 1.95 MHz, and the frequency adjustment step S may also be set to 1.542 MHz.

Further, a quantity K of frequency adjustment times may be calculated according to the foregoing formula (1).

If a reference clock frequency is 1575.42 MHz, a clock frequency deviation M is 1575.42 MHz−1560 MHz=15.42 MHz.

When the frequency adjustment step S is 1.542 MHz, the quantity K of frequency adjustment times is: K=ceil(15.42/1.542)=10, and 15.42 can be exactly divided by 1.542. Therefore, each frequency adjustment amount of the terminal device is the frequency adjustment step 1.542 MHz.

When the frequency adjustment step S is 1.95 MHz, the quantity K of frequency adjustment times is calculated as follows: K=ceil (15.42/1.95)=8, 15.42 cannot be exactly divided by 1.95, and 15.42−1.95×(8−1)=1.77 MHz. Therefore, the terminal device performs seven adjustments by using the frequency adjustment amount as the frequency adjustment step 1.95 MHz, and performs one adjustment by using the frequency adjustment amount 1.77 MHz.

S604: The terminal device adjusts the timing information of the terminal device based on the frequency adjustment step S and the quantity K of frequency adjustment times.

It should be noted that, in the process of the K times of frequency adjustment, one or more of the frequency adjustment amounts may be less than the frequency adjustment step S. The frequency adjustment may be any one or more of the K times of frequency adjustment, and this is not limited in this disclosure, provided that it can be ensured that the timing information of the terminal device is the same as the reference timing information after the K times of frequency adjustment.

In a possible design solution, the first apparatus of the terminal device sends an adjustment message to the second apparatus of the terminal device.

In the conventional technology, after the first apparatus of the terminal device adjusts the timing information, the second apparatus needs to measure a frequency deviation between the second apparatus and the first apparatus, calculate a frequency adjustment step, and then adjust the timing information based on the calculated frequency adjustment step. In this disclosure, the first apparatus of the terminal device sends the adjustment message to the second apparatus. A large quantity of calculation processes of the second apparatus is reduced, and clock calibration efficiency of the terminal device is improved.

For example, the adjustment message may include a frequency adjustment amount, and the frequency adjustment amount may be equal to the frequency adjustment step S. In other words, each time the first apparatus of the terminal device sends an adjustment message to the second apparatus, the second apparatus adjusts the timing information once. In this way, after K times of adjustment, it is finally implemented that the timing information of the terminal device is the same as the reference timing information.

For example, the adjustment message may include a frequency adjustment amount and the quantity K of frequency adjustment times, and the frequency adjustment amount may be equal to the frequency adjustment step S. In other words, the first apparatus of the terminal device may send the adjustment message to the second apparatus only once, and the second apparatus may adjust the timing information for a plurality of times based on the adjustment message, so that a quantity of interactions between the first apparatus and the second apparatus can be reduced, and therefore, clock calibration efficiency of the terminal device can be improved.

It should be noted that, when the clock frequency deviation cannot be exactly divided by the frequency adjustment step S, the adjustment message may further include a frequency adjustment amount less than the frequency adjustment step S.

Based on the clock calibration method in FIG. 6, after obtaining the reference timing information, the terminal device determines the clock frequency deviation between the terminal device and the first system, determines the frequency adjustment quantity based on the clock frequency deviation and the frequency adjustment step, and then gradually adjusts the timing information of the terminal device based on the frequency adjustment step and the frequency adjustment quantity, to resolve a problem that in a clock calibration process, the terminal device runs unstably or even crashes because a clock frequency deviation between clock nodes of the terminal device is excessively large, and therefore, to improves system stability of the terminal device.

The foregoing describes, in detail with reference to FIG. 3 to FIG. 8, the clock calibration method provided in the embodiments of this disclosure. The following describes in detail a clock calibration apparatus provided in the embodiments of this disclosure with reference to FIG. 9.

Figure 9:
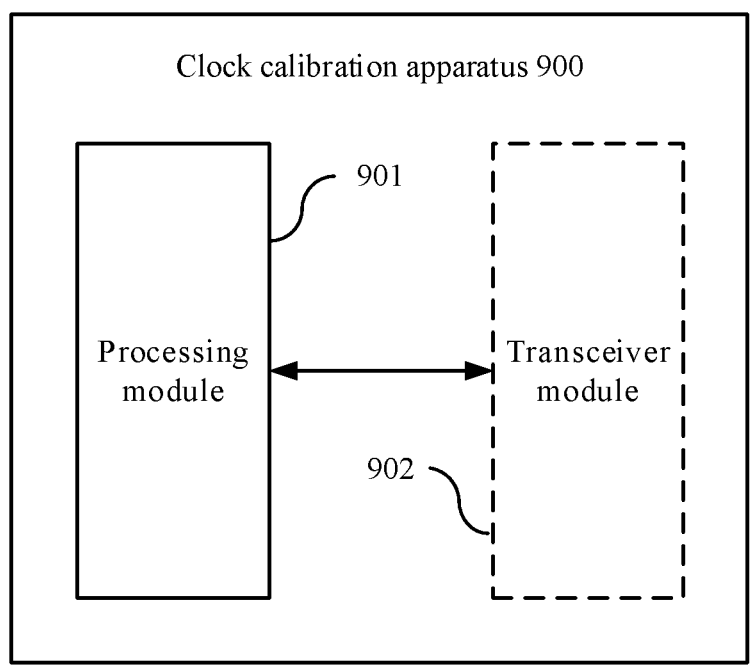
FIG. 9 is another schematic structural diagram of a clock calibration apparatus according to an embodiment of this disclosure.

FIG. 9 is another schematic structural diagram of a clock calibration apparatus according to an embodiment of this disclosure. As shown in FIG. 9, the clock calibration apparatus 900 includes a processing module 901. For ease of description, FIG. 9 shows only main components of the clock calibration apparatus.

In a possible design solution, the clock calibration apparatus 900 shown in FIG. 9 may be applicable to the communications system shown in FIG. 1, and perform a function of the terminal device in the clock calibration method shown in FIG. 3.

The processing module 901 is configured to use first timing information and adjust second timing information of the clock calibration apparatus 900 based on reference timing information. The first timing information is primary timing information, and the second timing information is standby timing information. The processing module 901 is further configured to, when determining that a first condition is met, switch from using the first timing information to using the second timing information. The first condition includes the first timing information is different from the reference timing information, and the second timing information is the same as the reference timing information; or the first timing information is different from the second timing information; or the first timing information is different from the reference timing information.

In a possible design solution, the reference timing information is timing information of a GPS, a BeiDou satellite navigation system, a Galileo satellite navigation system, or a GLONASS satellite navigation system.

In a possible design solution, the reference timing information includes a reference clock frequency and/or a reference time.

In a possible design solution, that the first timing information is different from the reference timing information includes a clock frequency of the first timing information is different from the reference clock frequency, and/or a time of the first timing information is different from the reference time.

In a possible design solution, the processing module 901 is further configured to adjust the first timing information, so that the first timing information is the same as the reference timing information. The processing module 901 is further configured to determine the first timing information as standby timing information, and/or the processing module 901 is further configured to determine the second timing information as primary timing information.

In another possible design solution, the processing module 901 is further configured to adjust the first timing information, so that the first timing information the same as the reference timing information. The processing module 901 is further configured to determine the first timing information as primary timing information, and/or the processing module 901 is further configured to determine the second timing information as standby timing information.

In a possible design solution, the processing module 901 is further configured to adjust the second timing information of the clock calibration apparatus 900 when determining that a second condition is met. The second condition includes the second timing information is different from the reference timing information.

In a possible design solution, the clock calibration apparatus 900 may further include a transceiver module 902. The transceiver module 902 is configured to receive data sent by a first system, for example, the reference timing information, and may be further configured to send data to another device. Further, the transceiver module 902 may include a receiving module and a sending module (not shown in FIG. 9). The receiving module is configured to receive data sent by the first system, and the sending module is configured to send data to the another device. An implementation of the transceiver module is not limited in this disclosure.

In a possible design solution, the clock calibration apparatus 900 may further include a storage module (not shown in FIG. 9), and the storage module stores a program or an instruction. When the processing module 901 executes the program or the instruction, the clock calibration apparatus 900 may perform a function of the terminal device in the clock calibration method shown in FIG. 3.

It should be noted that the clock calibration apparatus 900 may be the terminal device or the clock calibration apparatus 200, or may be a chip (system) or another component or component that may be disposed in the terminal device or the clock calibration apparatus 200. This is not limited in this disclosure.

In addition, for a technical effect of the clock calibration apparatus 900, refer to the technical effect of the clock calibration method shown in FIG. 3. Details are not described herein again.

In another possible design solution, the clock calibration apparatus 900 shown in FIG. 9 may be applicable to the communications system shown in FIG. 1, and perform a function of the terminal device in the clock calibration method shown in FIG. 6.

The processing module 901 is configured to obtain reference timing information. The processing module 901 is further configured to determine a clock frequency deviation M between the clock calibration apparatus 900 and the first system based on the reference timing information. The processing module 901 is further configured to determine a quantity K of frequency adjustment times based on the clock frequency deviation M and a frequency adjustment step S. The frequency adjustment step S is preset or determined based on a time synchronization error. The processing module 901 is further configured to adjust timing information of the clock calibration apparatus 900 based on the frequency adjustment step S and the quantity K of frequency adjustment times.

In a possible design solution, the quantity K of frequency adjustment times meets the following formula: K=ceil(M/S), where ceil is round-up.

In a possible design solution, that the frequency adjustment step S is determined based on the time synchronization error includes the frequency adjustment step S is determined based on a first adjustment time and the time synchronization error, the first adjustment time is a time required by the clock calibration apparatus 900 to adjust timing information once, and the time synchronization error is a maximum time error that the clock calibration apparatus 900 can bear.

In a possible design solution, the processing module 901 is further configured to control a first apparatus of the clock calibration apparatus 900 to send an adjustment message to a second apparatus of the clock calibration apparatus 900. The adjustment message includes a frequency adjustment amount, or a frequency adjustment amount and the quantity K of frequency adjustment times, and the frequency adjustment amount is less than or equal to the frequency adjustment step S.

In a possible design solution, the clock calibration apparatus 900 may further include a transceiver module 902. The transceiver module 902 is configured to receive data sent by the first system, and may be further configured to send data to another device. Further, the transceiver module 902 may include a receiving module and a sending module (not shown in FIG. 9). The receiving module is configured to receive data sent by the first system, and the sending module is configured to send data to the another device. An implementation of the transceiver module 902 is not limited in this disclosure.

In a possible design solution, the clock calibration apparatus 900 may further include a storage module (not shown in FIG. 9), and the storage module stores a program or an instruction. When the processing module 901 executes the program or the instruction, the clock calibration apparatus 900 may perform a function of the terminal device in the clock calibration method shown in FIG. 6.

It should be noted that the clock calibration apparatus 900 may be the terminal device or the clock calibration apparatus 200, or may be a chip (system) or another component or component that may be disposed in the terminal device or the clock calibration apparatus 200. This is not limited in this disclosure.

In addition, for a technical effect of the clock calibration apparatus 900 shown in FIG. 9, refer to the technical effect of the clock calibration method shown in FIG. 6. Details are not described herein again.

An embodiment of this disclosure provides a communications system. The system includes a terminal device and a first system, such as a GPS, a BeiDou satellite navigation system, a Galileo satellite navigation system, a GLONASS satellite navigation system, and an access network device having a time serving function.

An embodiment of this disclosure provides a computer readable storage medium, and the computer readable storage medium stores computer instructions. When the computer instruction is run on a computer, the computer is enabled to perform the clock calibration method in the foregoing method embodiments.

An embodiment of this disclosure provides a computer program product including instructions, including a computer program or instructions. When the computer program or the instructions is/are run on a computer, the computer is enabled to perform the clock calibration method in the foregoing method embodiment.

It should be understood that, the processor in the embodiments of this disclosure may be a CPU, or may further be another general purpose processor, a DSP, an ASIC, a FPGA, or another programmable logic device, discrete gate or transistor logic device, discrete hardware component, or the like. The general purpose processor may be a microprocessor, or the processor may be any conventional processor or the like.

It should be further understood that, the memory in this embodiment of this disclosure may be a volatile memory or a nonvolatile memory, or may include both a volatile memory and a nonvolatile memory. The nonvolatile memory may be a ROM, a programmable read-only memory (PROM), an erasable programmable read-only memory (EPROM), an EEPROM, or a flash memory. The volatile memory may be a RAM used as an external cache. As an example instead of a limitation, many forms of RAM may be used, for example, a static random access memory (SRAM), a dynamic RAM (DRAM), a synchronous DRAM (SDRAM), a double data rate SDRAM (DDR SDRAM), an enhanced SDRAM (ESDRAM), a SynchLink DRAM (SLDRAM), and a direct Rambus RAM (DR RAM).

All or some of the foregoing embodiments may be implemented by means of software, hardware (for example, circuit), firmware, or any combination thereof. When software is used to implement the embodiments, the foregoing embodiments may be implemented completely or partially in a form of a computer program product. The computer program product includes one or more computer instructions or computer programs. When the program instructions or the computer programs are loaded and executed on the computer, the procedure or functions according to the embodiments of this disclosure are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes only an association relationship for describing associated objects and represents that three relationships may exist. For example, A and/or B may represent the following three cases: only A exists, both A and B exist, and only B exists. A and B may be singular or plural. In addition, the character "/" in this specification usually represents an "or" relationship between the associated objects, or may represent an "and/or" relationship. A specific meaning depends on a context.

In this disclosure, "at least one" means one or more, and "a plurality of" means two or more. "At least one item (piece) of the following" or a similar expression thereof refers to any combination of these items, including any combination of singular items (pieces) or plural items (pieces). For example, at least one item (piece) of a, b, or c may indicate: a, b, c, a and b, a and c, b and c, or a, b, and c, where a, b, and c may be singular or plural.

It should be understood that sequence numbers of the foregoing processes do not mean execution sequences in various embodiments of this disclosure. The execution sequences of the processes should be determined according to functions and internal logic of the processes, and should not be construed as any limitation on the implementation processes of the embodiments of this disclosure.

A person of ordinary skill in the art may be aware that, in combination with the examples described in the embodiments disclosed in this specification, units or modules and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit or module, refer to a corresponding process in the foregoing method embodiments, and details are not described herein again.

In the several embodiments provided in this disclosure, it should be understood that the disclosed system, apparatus, and method may be implemented in other manners. For example, the described apparatus embodiment is merely an example. For example, the unit or module division is merely logical function division and may be other division in actual implementation. For example, a plurality of units or modules may be combined or integrated into another system, or some units or modules may be ignored, or functions corresponding to the units or modules are not performed. In addition, the displayed or discussed mutual couplings or direct couplings or communication connections may be implemented by using some interfaces. The indirect couplings or communication connections between the apparatuses or units/modules may be implemented in electronic, mechanical, or other forms.

The units/modules described as separate parts may or may not be physically separate, and parts displayed as units/modules may or may not be physical units, may be located in one position, or may be distributed on a plurality of network units/modules. Some or all of the units/modules may be selected based on actual requirements to achieve the objectives of the solutions of the embodiments.

In addition, functional units/modules in the embodiments of this disclosure may be integrated into one processing unit/module, or each of the units/modules may exist alone physically, or two or more units/modules are integrated into one unit/module.

When the functions are implemented in the form of a software functional unit/modules and sold or used as an independent product, the functions may be stored in a computer-readable storage medium. Based on such an understanding, the technical solutions of this disclosure essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this disclosure. The foregoing storage medium includes any medium that can store program code, such as a USB flash drive, a removable hard disk, a ROM, a RAM, a magnetic disk, or an optical disc.

The foregoing descriptions are merely implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A clock calibration method, comprising:
    using, by a terminal device, first timing information as primary timing information in a branch clock node of the terminal device, wherein the first timing information is of a first clock node of the terminal device;
    receiving, by the terminal device, reference timing information from a secondary device;

adjusting, by the terminal device and based on the reference timing information, second timing information as standby timing information, wherein the second timing information is of a second clock node of the terminal device;

switching, by the terminal device when determining that a first condition is met, from using the first timing information as the primary timing information to using the second timing information as the primary timing information in the branch clock node, wherein the first condition comprises the first timing information being different from the reference timing information, and the second timing information being the same as the reference timing information; and adjusting, by the terminal device after switching from using the first timing information to using the second timing information as the primary timing information, the first timing information to be the same as the reference timing information, wherein the first timing information and the second timing information are not adjusted, based on the reference timing information, when used as the primary timing information.

2. The clock calibration method of claim 1, wherein the reference timing information comprises at least one of a reference clock frequency or a reference time.

3. The clock calibration method of claim 2, wherein the first timing information being different from the reference timing information comprises at least one of: a clock frequency of the first timing information being different from the reference clock frequency, or a time of the first timing information being different from the reference time.

4. The clock calibration method of claim 1, further comprising setting, by the terminal device after adjusting the first timing information to be the same as the reference timing information, the first timing information as the standby timing information.

5. The clock calibration method of claim 1, further comprising setting, by the terminal device after adjusting the first timing information to be the same as the reference timing information, the first timing information as the primary timing information.

6. The clock calibration method of claim 1, wherein before switching from using the first timing information to using the second timing information, the clock calibration method:

determining, by the terminal device, whether a second condition is met, wherein the second condition comprises the second timing information being different from the reference timing information; and further adjusting, by the terminal device when the terminal device determines that the second condition is met, the second timing information based on the reference timing information.

7. A clock calibration apparatus, comprising:
a first clock node;
a second clock node;
a branch clock node;
a memory configured to store executable instructions; and
a processor coupled to the memory and configured to:
use first timing information as primary timing information in the branch clock node, wherein the first timing information is of the first clock node;
receive reference timing information from a secondary device;

adjust, based on the reference timing information, second timing information as standby timing information, wherein the second timing information is of the second clock node;

switch, when determining that a first condition is met, from using the first timing information as the primary timing information to using the second timing information as the primary timing information in the branch clock node, wherein the first condition comprises the first timing information is different from the reference timing information, and the second timing information is the same as the reference timing information; and adjust, after switching from using the first timing information to using the second timing information as the primary timing information, the first timing information to be the same as the reference timing information, wherein the first timing information and the second timing information are not adjusted, based on the reference timing information, when used as the primary timing information.

8. The clock calibration apparatus of claim 7, wherein the reference timing information comprises at least one of a reference clock frequency or a reference time.

9. The clock calibration apparatus of claim 8, wherein the first timing information being different from the reference timing information comprises at least one of: a clock frequency of the first timing information is different from the reference clock frequency, or a time of the first timing information is different from the reference time.

10. The clock calibration apparatus of claim 7, wherein the processor is further configured to update, after adjusting the first timing information to be the same as the reference timing information, the first timing information as the standby timing information.

11. The clock calibration apparatus of claim 7, wherein the processor is further configured to update, after adjusting the first timing information to be the same as the reference timing information, the first timing information as the primary timing information.

12. The clock calibration apparatus of claim 7, wherein before switching from using the first timing information to using the second timing information, the processor is further configured to further adjust the second timing information based on the reference timing information when determining that a second condition is met, and wherein the second condition comprises the second timing information being different from the reference timing information.

13. The clock calibration method of claim 4, further comprising setting, by the terminal device, the second timing information as the primary timing information.

14. The clock calibration method of claim 5, further comprising setting, by the terminal device, the second timing information as the standby timing information.

15. The clock calibration apparatus of claim 10, wherein the processor is further configured to set the second timing information as the primary timing information.

16. The clock calibration apparatus of claim 11, wherein the processor is further configured to set the second timing information as the standby timing information.

17. A clock calibration method, comprising:
using, by a terminal device, first timing information as primary timing information in a branch clock node of the terminal device, wherein the first timing information is of a first clock node of the terminal device;
receiving, by the terminal device, reference timing information from a secondary device;

adjusting, by the terminal device and based on the reference timing information, second timing information as standby timing information, wherein the second timing information is of a second clock node of the terminal device;

switching, by the terminal device when determining that a first condition is met, from using the first timing information as the primary timing information to using the second timing information as the primary timing information in the branch clock node, wherein the first condition comprises the first timing information being different from the reference timing information; and adjusting, by the terminal device after switching from using the first timing information to using the second timing information as the primary timing information, the first timing information to be the same as the reference timing information, wherein the first timing information and the second timing information are not adjusted, based on the reference timing information, when used as the primary timing information.

18. The clock calibration method of claim 17, further comprising setting, by the terminal device after adjusting the first timing information to be the same as the reference timing information, the first timing information as the standby timing information.

19. The clock calibration method of claim 17, further comprising setting, by the terminal device after adjusting the first timing information to be the same as the reference timing information, the first timing information as the primary timing information.

20. The clock calibration method of claim 17, wherein before switching from using the first timing information to using the second timing information, the clock calibration method:

determining, by the terminal device, whether a second condition is met, wherein the second condition comprises the second timing information being different from the reference timing information; and further adjusting, by the terminal device when the terminal device determines that the second condition is met, the second timing information based on the reference timing information.

* * * * *